(12) United States Patent
Chang et al.

(10) Patent No.: US 8,516,329 B2
(45) Date of Patent: Aug. 20, 2013

(54) METHOD OF GENERATING CODEWORD FOR A CONTROL SIGNAL AND FOR TRANSMITTING A CONTROL SIGNAL IN A WIRELESS COMMUNICATION SYSTEM USING AN EXTENDED RM MATRIX

(75) Inventors: Jae Won Chang, Anyang-si (KR); Bin Chul Ihm, Anyang-si (KR); Jin Young Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 951 days.

(21) Appl. No.: 12/448,092

(22) PCT Filed: Jan. 10, 2008

(86) PCT No.: PCT/KR2008/000158
§ 371 (c)(1),
(2), (4) Date: Oct. 22, 2009

(87) PCT Pub. No.: WO2008/084995
PCT Pub. Date: Jul. 17, 2008

(65) Prior Publication Data
US 2010/0115380 A1    May 6, 2010

(30) Foreign Application Priority Data
Jan. 10, 2007   (KR) ................ 10-2007-0002992

(51) Int. Cl.
*H04L 1/00* (2006.01)
(52) U.S. Cl.
USPC ............................ 714/752; 714/753; 714/758

(58) Field of Classification Search
USPC ................... 714/756, 752, 753, 758
See application file for complete search history.

(56) References Cited

U.S. PATENT DOCUMENTS

| | | | |
|---|---|---|---|
| 6,804,307 B1 | 10/2004 | Popovic | |
| 6,842,487 B1 | 1/2005 | Larsson | |
| 7,065,698 B2 * | 6/2006 | Oh | 714/784 |
| 7,191,376 B2 * | 3/2007 | Yedidia | 714/751 |
| 7,343,548 B2 * | 3/2008 | Blankenship et al. | 714/800 |
| 7,418,649 B2 * | 8/2008 | Li | 714/784 |
| 7,685,503 B2 * | 3/2010 | Ovchinnikov et al. | 714/784 |
| 7,774,678 B2 * | 8/2010 | Choi et al. | 714/758 |
| 7,996,746 B2 * | 8/2011 | Livshitz et al. | 714/758 |
| 2005/0281240 A1 | 12/2005 | Oh et al. | |
| 2007/0211667 A1 * | 9/2007 | Agrawal et al. | 370/335 |

FOREIGN PATENT DOCUMENTS
EP   1 605 607 A1   12/2005
WO   WO 01/56218 A1   8/2001

\* cited by examiner

*Primary Examiner* — Joseph Schell
(74) *Attorney, Agent, or Firm* — McKenna Long and Aldridge LLP

(57) ABSTRACT

A method of generating a codeword for a control signal in a wireless communication system is provided. The method includes preparing a control signal and generating a codeword by applying a Reed-Muller (RM) extension matrix to the control signal. The RM extension matrix is generated by extending a RM basic matrix. A control signal can reliably be transmitted by the codeword with low complexity.

11 Claims, 1 Drawing Sheet

METHOD OF GENERATING CODEWORD FOR A CONTROL SIGNAL AND FOR TRANSMITTING A CONTROL SIGNAL IN A WIRELESS COMMUNICATION SYSTEM USING AN EXTENDED RM MATRIX

This application claims the benefit of PCT/KR2008/000158 filed on Jan. 10, 2008 and also Korean Patent Application No. 10-2007-0002992 filed on Jan. 10, 2007, the contents of which are hereby incorporated herein by reference for all purposes in their entirety.

TECHNICAL FIELD

The present invention relates to wireless communication, and more particularly, to a method of generating a codeword for a control signal in a wireless communication system.

BACKGROUND ART

A variety of methods for transmitting high-quality and high-volume data using limited radio resources has been appeared in current wireless communication systems. An orthogonal frequency division multiplexing (OFDM) employs a plurality of subcarriers having orthogonality.

A codeword refers to a bit stream which is generated by subjecting information bits comprised of '0' and '1' to a specific rule so as to improve detection performance in the presence of noise.

In wireless communication system, there are two detection methods to reproduce information bits from a codeword. In coherent detection, a pilot symbol is used to estimate a channel. In non-coherent detection, orthogonal codes is used to detect a codeword.

In coherent diction, a receiver estimates a channel using a pilot symbol. The pilot symbol is data that is known to both a base station and a user equipment. A received signal y can be represented as shown MathFigure 1

$$y = hx + v \qquad [\text{Math.1}]$$

where x denotes a transmit signal, h a channel, and v an Additive White Gaussian Noise (AWGN).

Since the pilot symbol has been already known, a channel for the pilot symbol can be estimated. The received signal y can be reproduced as shown MathFigure 2

$$\frac{y}{\hat{h}} = \frac{hx+v}{\hat{h}} \simeq x + \overline{v} \qquad [\text{Math. 2}]$$

where $\hat{h}$ denotes estimated channel for the pilot symbol. As a result, it is required to accurately estimate a channel to reduce detection error.

Since data is reproduced using a channel for the pilot symbol, a channel for the data has to be same with the channel for the pilot symbol in order to achieve ideal detection. But the channel for the pilot symbol is different with the channel for the data in time domain and/or frequency domain. In other word, detection performance is better as the pilot symbol is closer to the data and the number of pilot symbols is larger. But as the number of pilot symbols increase, data rate may be constrained.

In non-coherent detection, a codeword is created by orthogonal codes. The codeword is detected by a correlator. The detected codeword is demapped to obtain information bits. Although a pilot symbol is not necessary, complexity of the correlator is taken into consideration.

A codeword using channel coding shows poor detection performance when the length of the codeword is not enough long. In addition, there occurs performance degradation under time-varying channel due to channel estimation error.

A codeword using the orthogonal codes shows relatively good detection performance even when the length of the codeword is shorter than that of the codeword using the channel coding. Detection performance does not depend on error of channel estimation. But the complexity of a correlator increases as the length of the codeword is increased. Therefore, a method is sought for efficiently generating a codeword without requiring the channel estimation. Moreover a method is sought for reducing complexity of the correlator in a receiver.

DISCLOSURE OF INVENTION

Technical Problem

The present invention provides a method of generating a codeword using orthogonal codes.

The present invention also provides a method of transmitting a control signal using a plurality of subcarriers.

Technical Solution

In one aspect, a method of generating a codeword for a control signal in a wireless communication system is provided. The method includes preparing a control signal and generating a codeword by applying a Reed-Muller (RM) extension matrix to the control signal. The RM extension matrix is generated by extending a RM basic matrix.

In another aspect, a method of transmitting a control signal using a plurality of subcarriers in a wireless communication system is provided. The method includes generating a codeword from the control signal using RM code, mapping the codeword to a plurality of data symbols, mapping the plurality of data symbols to a plurality of subcarriers, and transmitting the plurality of subcarriers.

Advantageous Effects

A codeword having a bit of a variable length corresponding to a control signal can be generated by using block code. The codeword can adapt non-coherent detection. A control signal can reliably be transmitted by the codeword. The codeword can be easily detected by a receiver.

MODE FOR THE INVENTION

A wireless communication system provides various communication services using a variety of data such as moving picture, voices, texts, etc.

A codeword refers to a bit stream which is created by subjecting an information bit to a specific rule so as to improve detection performance. Channel code can be classified into block-type channel code and trellis-type channel code. The block-type channel code includes Bose-Chadhuri-Hocquenghem (BCH) code and Reed-Muller (RM) code. A generating matrix is a matrix to generate a codeword in the block-type channel code. The trellis-type channel code includes convolution code and turbo code. A generating polynomial is a polynomial to generate a codeword in the trellis-type channel code.

In non-coherent detection in which the channel estimation is not needed, a codeword is generated using an orthogonal code which has excellent characteristics in autocorrelation and cross-correlation.

In a wireless communication system, a control signal is exchanged between a base station and a user equipment. A control signal includes Channel Quality Information (CQI), an Acknowledgment (ACK)/Non-acknowledgment (NACK) signal, a Multiple-Input Multiple-Output (MIMO) codebook index, etc. Control signal also includes information used to decode user data.

Figure 1:
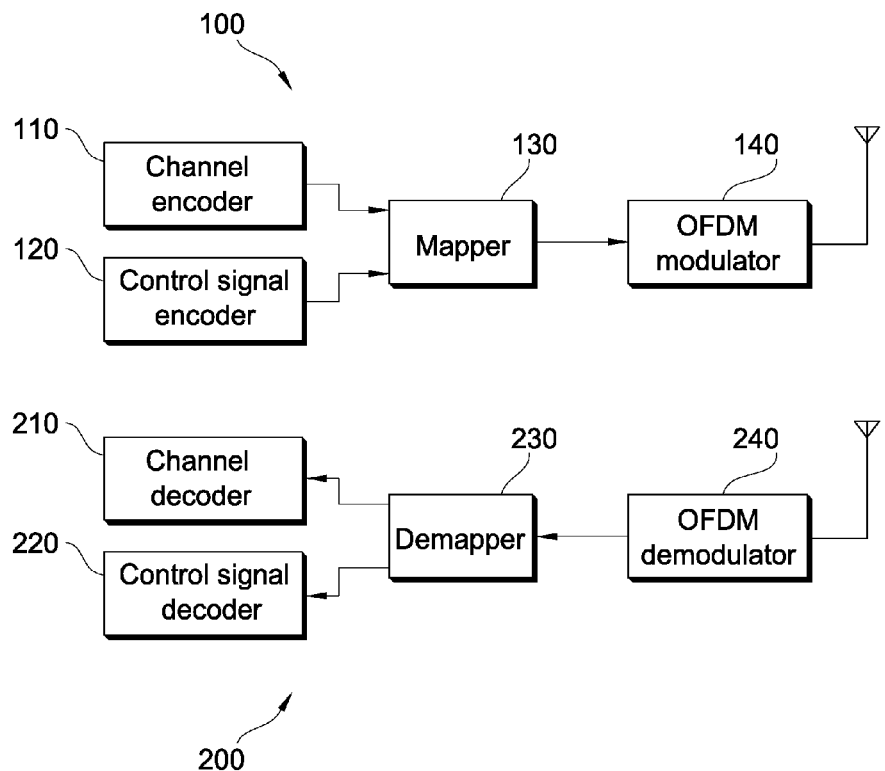
FIG. 1 is a block diagram showing a transmitter and a receiver according to an embodiment of the present invention.

FIG. 1 is a block diagram showing a transmitter and a receiver according to an embodiment of the present invention.

Referring to FIG. 1, a transmitter 100 includes a channel encoder 110, a control signal encoder 120, a mapper 130 and an OFDM modulator 140. The channel encoder 110 encodes information bits and generates a codeword. The mapper 130 maps a codeword to a symbol over signal constellation. There is no limitation in a modulation scheme performed in the mapper 130. The modulation scheme may be an m-Phase Shift Keying (m-PSK) or an m-Quadrature Amplitude Modulation (m-QAM). For example, the m-PSK may be BPSK, QPSK or 8-PSK. The m-QAM may be 16-QAM, 64-QAM or 256-QAM. The OFDM modulator 140 modulates the symbol according to an orthogonal frequency division multiplexing (OFDM) scheme. The OFDM modulator 140 performs an Inverse fast Fourier transform (IFFT) on the symbol and generates an OFDM symbol. The OFDM symbol is transmitted through a transmit antenna.

The control signal encoder 120 encodes a control signal to generate a codeword. The codeword can be generated by a block coding employing a block code as the coding scheme. In the block coding, the control signal can be encoded by using a RM code.

The receiver 200 includes an OFDM demodulator 240, a demapper 230, a channel decoder 210 and a control signal decoder 220. The OFDM demodulator 240 performs fast Fourier transform (FFT) on a receive signal. The demapper 230 demaps the FFT-performed signal to generate coded data. The channel decoder 210 decodes the coded data to reproduce an original data. The control signal decoder 220 decodes a signal demapped by the demapper 230 to output a control signal.

Communication system based on OFDM uses multiple subcarriers. Institute of Electrical and Electronics Engineers (IEEE) 802.16 "Part 16: Air Interface for Fixed Broadband Wireless Access Systems" standard is one of wireless communication standard based on OFDM. In IEEE 802.16 standard approved in 2004 (hereinafter, IEEE 802.16-2004), the mapping of logical subchannels to physical subcarriers is termed permutation. The OFDMA PHY in the IEEE 802.16-2004 standard specifies seven permutation mechanisms: FUSC (Full Usage of Subchannels), PUSC (Partial_Usage of Subchannels), O-FUSC (Optional-FUSC), O-PUSC, AMC (Adaptive Mudulation and Coding), TUSC1 (Tile Use of Sub Channel type 1), and TUSC2. On the downlink PUSC, each physical channel is split into clusters of fourteen subcarriers. On the uplink PUSC, subcarriers are split into groups of four consecutive physical subcarriers over a period of three OFDM symbols. Such a group is termed a tile. Six of those tiles are allocated to one subchannel. O-PUSC uses tiles sized three subcarriers by three OFDM symbols, where only the center is allocated as a pilot symbol.

Figure 2:
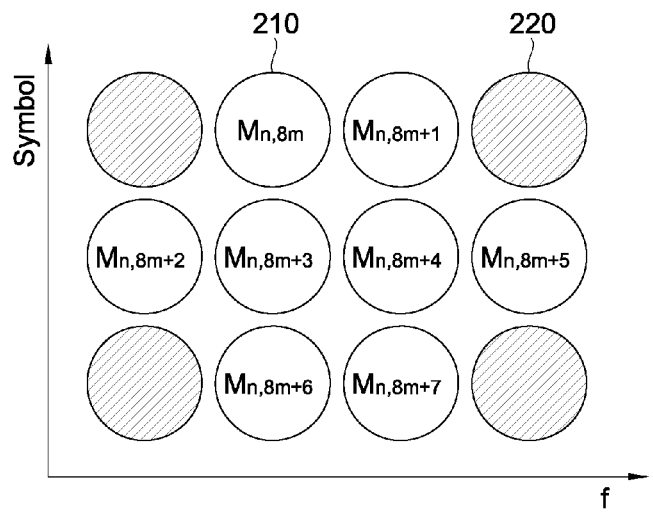
FIG. 2 shows a tile structure used for PUSC.

FIG. 2 shows a tile structure used for PUSC.

Referring to FIG. 2, $M_{n,8m+k}$ denotes a k-th transmission symbol index of an m-th uplink tile of an n-th feedback channel. The tile sized four subcarriers by three OFDM symbols includes total twelve subcarriers. 4 subcarriers 220 at corners of the tile are used for pilot symbols and remaining 8 subcarriers 210 is used for data symbols. When QPSK is used, information of 2 bits can be mapped to one data symbol. Accordingly, one tile can transmit information of 16 bits. When 16-QAM is used, one tile can transmit information of 32 bits.

The control signal encoder 120 can encode the control signal by block code to generate a codeword. The block code is a Reed-Muller (RM) code.

A control signal can have a bit of a given length such as one bit, three bits, four bits, six bits or the like. In uplink, a control signal having a given bit number can be transmitted using one tile or a plurality of tiles, and the number of tiles used for transmission of the control signal varies depending on the number of bits of the control signal.

Table 1 shows an example of vector indexes for three tiles for three bits used in the IEEE 802.16-2004 standard.

TABLE 1

| 3 bit | Vector indexes of each tile |
|---|---|
| 000 | 0, 0, 0 |
| 001 | 1, 1, 1 |
| 010 | 2, 2, 2 |
| 011 | 3, 3, 3 |
| 100 | 4, 4, 4 |
| 101 | 5, 5, 5 |
| 110 | 6, 6, 6 |
| 111 | 7, 7, 7 |

Since three tiles are used for a three-bit control signal, 24 (=8×3) data symbols can be transmitted. A vector is composed of eight data symbols as shown in section 8.4.5.4.10 of IEEE 802.16-2004 standard.

Although table 1 show predetermined mapping a codeword to physical subcarriers, conventional modulation scheme can be used. When QPSK modulation in which two-bit data is mapped to one data symbol is used, a codeword of 48 (=24×2) bits can be transmitted through three tiles. When 16-QAM modulation in which four-bit data is mapped to as one data symbol is used, a codeword of 96 (=24×4) bits can be transmitted through three tiles.

Since the bit number of a codeword varies depending on the number of tiles and a modulation scheme, the size of a RM code needs to vary. The size of a generating matrix used in the block code needs to vary depending on the bit number of the codeword.

A RM code for the three-bit codeword becomes a RM basic matrix having a size of 3×4. The RM basic matrix $G_B$ is represented as shown MathFigure 3

$$G_B = \begin{bmatrix} 0101 \\ 0011 \\ 1111 \end{bmatrix} \quad [\text{Math. 3}]$$

When a three-bit control signal is multiplied by the RM basic matrix, a codeword of four bits can be generated. To generate a codeword of 48 bits or 96 bits, it is required that the RM basic matrix is extended.

A RM basic matrix GB refers to a matrix having a size of $n \times 2^{n-1}$ for an n-bit signal, and a RM extension matrix GE refers to a matrix extended by adding a given number of columns to the RM basic matrix. When an n-bit control signal is multiplied by the RM basic matrix, a codeword having a size of $2^{n-1}$ can be obtained. When an n-bit control signal c is multiplied by a RM extension matrix having a size of n×m, an m-bit codeword r can be obtained as follows.

MathFigure 4

$$\underset{1\times m}{r} = \underset{1\times n}{c} \times \underset{n\times m}{G} \quad [\text{Math. 4}]$$

As shown above, a three-bit codeword for a control signal uses three tiles according to the IEEE 802.16-2004 standard. The three tiles are composed of 24 subcarriers. When QPSK modulation is used, a codeword of 48 bits can be transmitted through the three tiles. In order to generate a 48-bit codeword from a 3-bit control signal, a RM basic matrix having a size of 3×4 must be extended to a RM extension matrix having a size of 3×48.

Various methods can be applied to a RM basic matrix in order to extend the RM basic matrix to a RM extension matrix.

In one embodiment, a dummy matrix $G_D$ can be added to a basic matrix $G_B$ to create an extension matrix $G_E$ as shown MathFigure 5

$$G_E = [G_B | G_D] \quad [\text{Math. 5}]$$

where $G_D$ denotes a dummy matrix in which every element equal to one in the last row and all other elements of the remaining rows equal to zero. Thus, a dummy matrix having of a size of 3×44 can be added to a RM basic matrix $G_B$ having a size of 3×4 with respect to a three-bit control signal so as to create a RM extension matrix $G_E$ having a size of 3×48 as follows MathFigure 6

[Math. 6]

$$G_E = [G_B | G_D]$$
$$= \begin{bmatrix} 0101 & 00000000000000000000000000000000000000000000 \\ 0011 & 00000000000000000000000000000000000000000000 \\ 1111 & 11111111111111111111111111111111111111111111 \end{bmatrix}$$

In another embodiment, a bi-orthogonal matrix $G_R$ can be added to a RM basic matrix $G_B$ so as to create a RM extension matrix $G_E$ as shown MathFigure 7

$$G_E = [G_B | G_R] \quad [\text{Math. 7}]$$

where the bi-orthogonal matrix refers to a matrix obtained by inverting the RM basic matrix.

Although the bi-orthogonal matrix is added to the RM basic matrix $G_B$, its size is smaller than the size of a desired extension matrix. In this case, a dummy matrix $G_D$ can be added to the RM basic matrix $G_B$ so as to obtain a RM extension matrix $G_E$ as shown MathFigure 8

$$G_E = [G_B | G_R | G_D] \quad [\text{Math. 8}]$$

A bi-orthogonal matrix $G_R$ having a size of 3×4 can be applied to a RM basic matrix having a size of 3×4, and a dummy matrix $G_D$ having a size of 3×40 can be added to the RM basic matrix. The dummy matrix having a size of 3×40 is a matrix in which every element of the third row equals to one and all the elements of the other rows equal to zero. Thus, a RM extension matrix $G_E$ can be obtained as shown MathFigure 9

[Math. 9]

$$G_E = [G_B | G_R | G_D]$$
$$= \begin{bmatrix} 0101 & 0101 & 0000000000000000000000000000000000000000 \\ 0011 & 0011 & 0000000000000000000000000000000000000000 \\ 0000 & 1111 & 1111111111111111111111111111111111111111 \end{bmatrix}$$

In still another embodiment, a RM extension matrix can be generated through repeated addition of a RM basic matrix as shown MathFigure 10

$$G_E = [G_B | G_B \ldots G_B] \quad [\text{Math. 10}]$$

The RM extension matrix can be obtained by the repeated addition of the RM basic matrix, and the number of the repeated additions depends on the size of the RM extension matrix. For example, a RM basic matrix can be added repeatedly 12 times so as to generate a RM extension matrix having a size of 3×48 as shown MathFigure 11

$$G_E = [G_B | G_B | G_B | G_B | G_B | G_B | G_B | G_B | G_B | G_B | G_B | G_B] \quad [\text{Math. 11}]$$

$$= \begin{bmatrix} 0101 & 0101 & 0101 & 0101 & 0101 & 0101 & 0101 & 0101 & 0101 & 0101 & 0101 & 0101 \\ 0011 & 0011 & 0011 & 0011 & 0011 & 0011 & 0011 & 0011 & 0011 & 0011 & 0011 & 0011 \\ 1111 & 1111 & 1111 & 1111 & 1111 & 1111 & 1111 & 1111 & 1111 & 1111 & 1111 & 1111 \end{bmatrix}$$

In still another embodiment, a RM extension matrix $G_E$ can be generated by the repeated addition of a bi-orthogonal matrix $G_R$ to the RM basic matrix GB. For example, a RM extension matrix $G_E$ having a size of 3×48 can be obtained by the repeated addition of a matrix having a size of 3×8 created by adding a bi-orthogonal matrix having a size of 3×4 to a RM basic matrix having a size of 3×4 as shown MathFigure 12

$$G_E = [\,G_B\,|\,G_R\,|\,G_B\,|\,G_R\,|\,G_B\,|\,G_R\,|\,G_B\,|\,G_R\,|\,G_B\,|\,G_R\,|\,G_B\,|\,G_R\,]$$

$$= \begin{bmatrix} 0101 & | & 0101 & | & 0101 & 0101 & | & 0101 & 0101 & | & 0101 & 0101 & | & 0101 & 0101 & | & 0101 & 0101 \\ 0011 & | & 0011 & | & 0011 & 0011 & | & 0011 & 0011 & | & 0011 & 0011 & | & 0011 & 0011 & | & 0011 & 0011 \\ 0000 & | & 1111 & | & 0000 & 1111 & | & 0000 & 1111 & | & 0000 & 1111 & | & 0000 & 1111 & | & 0000 & 1111 \end{bmatrix}$$

[Math. 12]

A RM basic matrix $G_B$ can be extended in various methods so as to create a RM extension matrix $G_E$. Thus, a 48-bit codeword can be created by multiplying a RM extension matrix having a size of 3×48 by a three-bit control signal.

Now, it is assumed that six tiles are used for a four-bit control signal. The six tiles are composed of 48 subcarriers. When QPSK modulation is used, a codeword of 96 bits can be transmitted through the six tiles. It is required that a RM extension matrix $G_E$ has a size of 4×96.

A matrix having a size of 4×8 is considered to be the RM basic matrix $G_B$ as shown MathFigure 13

$$G_B = \begin{bmatrix} 01010101 \\ 00110011 \\ 00001111 \\ 11111111 \end{bmatrix}$$

[Math. 13]

In one embodiment, a dummy matrix having a size of 4×88 can be added to a RM basic matrix so as to create a RM extension matrix $G_E$ having a size of 4×96 as shown MathFigure 14

$$G_E = \begin{bmatrix} 01010101 & | & 0000000000000000000000000000000000000000000000000000000000000000000000000000000000000000 \\ 00110011 & | & 0000000000000000000000000000000000000000000000000000000000000000000000000000000000000000 \\ 00001111 & | & 0000000000000000000000000000000000000000000000000000000000000000000000000000000000000000 \\ 11111111 & | & 1111111111111111111111111111111111111111111111111111111111111111111111111111111111111111 \end{bmatrix}$$

[Math. 14]

The dummy matrix in which every element of the last row equals to one and all the elements of the other rows equal to zero is added to the RM basic matrix. A 96-bit codeword can be created by multiplying the RM extension matrix $G_E$ by a four-bit control signal.

In another embodiment, a bi-orthogonal matrix $G_R$ can be added to a RM basic matrix, and a dummy matrix $G_D$ can be also added to the RM basic matrix. Thus, a bi-orthogonal matrix having a size of 4×8 and a dummy matrix having a size of 4×80 are added to a RM basic matrix having a size of 4×8 so as to create a RM extension matrix $G_E$ as shown MathFigure 15

$$G_E = \begin{bmatrix} 01010101 & | & 01010101 & | & 00000000000000000000000000000000000000000000000000000000000000000000000000000000 \\ 00110011 & | & 00110011 & | & 00000000000000000000000000000000000000000000000000000000000000000000000000000000 \\ 00001111 & | & 00001111 & | & 00000000000000000000000000000000000000000000000000000000000000000000000000000000 \\ 00000000 & | & 11111111 & | & 11111111111111111111111111111111111111111111111111111111111111111111111111111111 \end{bmatrix}$$

[Math. 15]

In still another embodiment, a RM basic matrix $G_B$ can be extended by the repeated addition of a RM basic matrix $G_B$ having a size of 4×8. Thus, a RM basic matrix having a size of 4×8 can be repeatedly added 12 times so as to create a RM extension matrix having a size of 4×96 as shown MathFigure 16

[Math. 16]

$$G_E = \begin{bmatrix} 01010101 & | & 01010101 & | & 01010101 & | & 01010101 & | & 01010101 & | & 01010101 & | & 01010101 & | & 01010101 & | & 01010101 & | & 01010101 & | & 01010101 & | & 01010101 \\ 00110011 & | & 00110011 & | & 00110011 & | & 00110011 & | & 00110011 & | & 00110011 & | & 00110011 & | & 00110011 & | & 00110011 & | & 00110011 & | & 00110011 & | & 00110011 \\ 00001111 & | & 00001111 & | & 00001111 & | & 00001111 & | & 00001111 & | & 00001111 & | & 00001111 & | & 00001111 & | & 00001111 & | & 00001111 & | & 00001111 & | & 00001111 \\ 11111111 & | & 11111111 & | & 11111111 & | & 11111111 & | & 11111111 & | & 11111111 & | & 11111111 & | & 11111111 & | & 11111111 & | & 11111111 & | & 11111111 & | & 11111111 \end{bmatrix}$$

In still another embodiment, a RM extension matrix $G_E$ having a size of 4×96 can be obtained by the repeated addition of a matrix having a size of 4×16 created by adding a bi-orthogonal matrix having a size of 4×8 to a RM basic matrix having a size of 4×8 as follows MathFigure 17

$$G_E = \begin{bmatrix} 01010101 & 01010101 & 01010101 & 01010101 & 01010101 & 01010101 & 01010101 & 01010101 & 01010101 & 01010101 & 01010101 & 01010101 \\ 00110011 & 00110011 & 00110011 & 00110011 & 00110011 & 00110011 & 00110011 & 00110011 & 00110011 & 00110011 & 00110011 & 00110011 \\ 00001111 & 00001111 & 00001111 & 00001111 & 00001111 & 00001111 & 00001111 & 00001111 & 00001111 & 00001111 & 00001111 & 00001111 \\ 00000000 & 11111111 & 00000000 & 11111111 & 00000000 & 11111111 & 00000000 & 11111111 & 00000000 & 11111111 & 00000000 & 11111111 \end{bmatrix}$$ [Math. 17]

A RM basic matrix can be extended so as to encode a four-bit control signal to 96 bits. In order to create a RM extension matrix having a size of 4×96, a dummy matrix can added to a RM basic matrix, a RM basic matrix can repeatedly added, a bi-orthogonal matrix and a dummy matrix can be added to a RM basic matrix, or a matrix consisting of a RM basic matrix and a bi-orthogonal matrix can be repeated.

A codeword can be created by the RM coding with respect to a six-bit control signal.

It is assumed that six tiles are used for a six-bit control signal. The six tiles are composed of 48 subcarriers. When QPSK modulation is used, a codeword of 96 (48×2) bits can be transmitted through the six tiles. Thus, it is required that a RM extension matrix $G_E$ has a size of 4×96.

A RM basic matrix having a size of 6×32 can be used to encode a six-bit signal. A RM extension matrix having a size of 6×96 is needed to generate a 96-bit codeword. Thus, various methods can be applied to extend a RM basic matrix having a size of 6×32 to a RM extension matrix having a size of 6×96.

The RM basic matrix having a size of 6×32 is as follows

MathFigure 18

$$G_B = \begin{bmatrix} 01010101010101010101010101010101 \\ 00110011001100110011001100110011 \\ 00001111000011110000111100001111 \\ 00000000111111110000000011111111 \\ 00000000000000001111111111111111 \\ 11111111111111111111111111111111 \end{bmatrix}$$ [Math. 18]

In one embodiment, a dummy matrix having a size of 6×64 can be added to a RM basic matrix having a size of 6×32 so as to create a RM extension matrix having a size of 6×96 as follows:

MathFigure 19

$$G_E = \begin{bmatrix} 01010101010101010101010101010101 & 0000000000000000000000000000000000000000000000000000000000000000 \\ 00110011001100110011001100110011 & 0000000000000000000000000000000000000000000000000000000000000000 \\ 00001111000011110000111100001111 & 0000000000000000000000000000000000000000000000000000000000000000 \\ 00000000111111110000000011111111 & 0000000000000000000000000000000000000000000000000000000000000000 \\ 00000000000000001111111111111111 & 0000000000000000000000000000000000000000000000000000000000000000 \\ 11111111111111111111111111111111 & 1111111111111111111111111111111111111111111111111111111111111111 \end{bmatrix}$$ [Math. 19]

Here, every element of the last row of the dummy matrix equals to one, all the elements of the other rows may equal to zero.

In another embodiment, a bi-orthogonal matrix and a dummy matrix may be added to a RM basic matrix. Thus, a bi-orthogonal matrix having a size of 6×32 is added to a RM basic matrix having a size of 6×32 to create an extension matrix having a size of 6×64.

MathFigure 20

$$G_E = \begin{bmatrix} 01010101010101010101010101010101 & 01010101010101010101010101010101 & 00000000000000000000000000000000 \\ 00110011001100110011001100110011 & 00110011001100110011001100110011 & 00000000000000000000000000000000 \\ 00001111000011110000111100001111 & 00001111000011110000111100001111 & 00000000000000000000000000000000 \\ 00000000111111110000000011111111 & 00000000111111110000000011111111 & 00000000000000000000000000000000 \\ 00000000000000001111111111111111 & 00000000000000001111111111111111 & 00000000000000000000000000000000 \\ 00000000000000000000000000000000 & 11111111111111111111111111111111 & 11111111111111111111111111111111 \end{bmatrix}$$ [Math. 20]

A dummy matrix can be added to the extension matrix having a size of 6×64 to complement a matrix having a size of 6×32.

In still another embodiment, a RM basic matrix having a size of 6×32 can be repeatedly added to create a RM extension matrix having a size of 6×96 as shown MathFigure 21

$$G_E = \begin{bmatrix} 0101010101010101010101010101 & 0101010101010101010101010101 & 0101010101010101010101010101 \\ 0011001100110011001100110011 & 0011001100110011001100110011 & 0011001100110011001100110011 \\ 0000111100001111000011110000 & 0000111100001111000011110000 & 0000111100001111000011110000 \\ 0000000011111111000000001111 & 0000000011111111000000001111 & 0000000011111111000000001111 \\ 0000000000000000111111111111 & 0000000000000000111111111111 & 0000000000000000111111111111 \\ 1111111111111111111111111111 & 1111111111111111111111111111 & 1111111111111111111111111111 \end{bmatrix}$$ [Math. 21]

In still another embodiment, a bi-orthogonal matrix can be added to a RM basic matrix and the bi-orthogonal matrix can be repeatedly added. For example, a bi-orthogonal matrix having a size of 6×32 can be added to a RM basic matrix having a size of 6×32, and then bi-orthogonal matrix having a size of 6×32 is repeatedly added to create a RM extension matrix as follows MathFigure 22

$$G_E = \begin{bmatrix} 0101010101010101010101010101 & 0101010101010101010101010101 & 0101010101010101010101010101 \\ 0011001100110011001100110011 & 0011001100110011001100110011 & 0011001100110011001100110011 \\ 0000111100001111000011110000 & 0000111100001111000011110000 & 0000111100001111000011110000 \\ 0000000011111111000000001111 & 0000000011111111000000001111 & 0000000011111111000000001111 \\ 0000000000000000111111111111 & 0000000000000000111111111111 & 0000000000000000111111111111 \\ 0000000000000000000000000000 & 1111111111111111111111111111 & 1111111111111111111111111111 \end{bmatrix}$$ [Math. 22]

The RM extension matrix may be created by adding a matrix in which a bi-orthogonal matrix is added to a RM basic matrix to a matrix in which a bi-orthogonal matrix is added to a RM basic matrix. The size of RM extension matrix in which a bi-orthogonal matrix is added to a RM basic matrix is 6×128, so that 32 columns must be truncated to create a RM extension matrix having a size of 6×96. Thus, 32 columns can be truncated as shown in the following Equation 23 to crate the same RM extension matrix as that shown in Equation 22.

MathFigure 23

A RM extension matrix having a size of 6×96 can be created by the repeated addition of a bi-orthogonal matrix to a RM basic matrix having a size of 6×32, the addition of an additional matrix, etc., to thereby create a 96-bit codeword with respect to a six-bit control signal.

A 96-bit codeword can be created by multiplying a RM extension matrix having a size of 6×96 by a six-bit control signal, at which time the six-bit control signal can be encoded.

Now, it is assumed that three tiles are used for a one-bit control signal. The one-bit control signal is transmitted through the three tiles. When QPSK modulation is used, a codeword of 48 bits can be transmitted through the three tiles. It is required that a RM extension matrix GE has a size of 4×96.

A RM basic matrix can be extended to encode a one-bit control signal to a 48-bit codeword. For example, a RM basic matrix can be used to create a codeword using a RM extension matrix having a size of 1×48. A general RM code corresponding to one bit is a RM basic matrix having a size of 1×1, and every element of the RM basic matrix equals to one.

[Math.23]

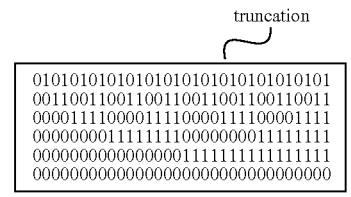

In one embodiment, a RM extension matrix having a size of 1×48 can be created by adding a dummy matrix to a RM basic matrix as follows:

MathFigure 24

$$G_E=[111111111111111111111111111111111111111111111111] \quad [\text{Math.24}]$$

In another embodiment, a RM extension matrix having a size of 1×48 can be created by using a bi-orthogonal matrix as follows:

MathFigure 25

$$G_E=[000000000000000000000000111111111111111111111111] \quad [\text{Math.25}]$$

Likewise, a 48-bit codeword can be obtained by multiplying the created RM extension matrix having a size of 1×48 by a one-bit control signal.

A process in which a receiver decodes a codeword created by the RM coding scheme is described hereinafter.

A codeword obtained by the RM extension matrix can be recovered by a soft-decision method using a Hadamard matrix. For example, a RM matrix having a size of 6×32 can be expressed by the following vector:

MathFigure 26

$$\begin{bmatrix} v_1 = (01010101010101010101010101010101) \\ v_2 = (00110011001100110011001100110011) \\ v_3 = (00001111000011110000111100001111) \\ v_4 = (00000000111111110000000011111111) \\ v_5 = (00000000000000001111111111111111) \end{bmatrix} = G_1 \quad [\text{Math. 26}]$$

$$[1 = (11111111111111111111111111111111)] = G_0$$

A six-bit control signal can be expressed as shown

MathFigure 27

$$c=(m_1,m_2,m_3,m_4,m_5,m_0)=[m_1|m_0] \quad [\text{Math.27}]$$

where $m_1=(m_1, m_2, m_3, m_4, m_5)$ and $m_0=(m_0)$

Thus, a codeword r, i.e., a product of a six-bit control signal and a RM matrix can be expressed as follows:

MathFigure 28

$$[m_1 | m_0]\begin{bmatrix} G_1 \\ G_0 \end{bmatrix} = r \quad [\text{Math. 28}]$$
$$= m_1 v_1 + m_2 v_2 + m_3 v_3 + m_4 v_4 + m_5 v_5 + m_0 1$$

Thus, a six-bit control signal can be created as a 32-bit codeword.

The most approximate linear combination can be estimated as a transmitted codeword by calculating the correlation between a received codeword and a linear combination of each row in a RM matrix by utilizing encoding parameters expressed by the Equation 28.

It is assumed that the encoded codeword is received as a vector r by a receiver. Then, the estimated codeword can be estimated by the following process. Herein, this is applied to a 32-bit codeword for the sake of clarity of explanation, but may be applied to a codeword having an arbitrary size.

(a) Each element of a received vector r is multiplied by −1 to calculate a value of −r.

(b) A Hadamard matrix having a size of 32×32 is multiplied by −r to calculate a value of a.

$a=-r\times H_{32}=(a_0, a_1, a_2, \ldots, a_{29}, a_{30}, a_{31})$, where $H_{32}$: 32×32 Hadamard matrix.

(c) A max(a) in which the value of a is maximum is obtained.

$\text{Max}(a_0, a_1, a_2, \ldots, a_{29}, a_{30}, a_{31})=a_k$.

(d) k as an index in which a indicates the maximum value is converted into a binary number $(b_1, b_2, b_3, b_4, b_5)$.

(e) A estimated codeword is calculated as follows depending on whether the value of max(a) found in the step (c) is a positive number of a negative number:

MathFigure 29

$$\text{if } \max(a)>0 \text{ then } \hat{r}=b_5v_1+b_4v_2+b_3v_3+b_2v_4+b_1v_5$$
$$\text{else } \hat{r}=1+b_5v_1+b_4v_2+b_3v_3+b_2v_4+b_1v_5 \quad [\text{Math.29}]$$

In case of a Hard-decision, when a signal indicating 0 or 1 equals 1 after the binary phase shifting keying (BPSK) demodulation, it is mapped to −1, and when the signal indicating 0 or 1 equals 0, it is mapped to 1. Then, the mapped value is multiplied by the Hadamard matrix in place of −r in the step (b) and the remaining steps are the same as those in the above process.

A receiver estimates a codeword based on the Hadamard matrix. A control signal can be reproduced form the estimated codeword by majority rule decoding.

A codeword having a bit of a variable length corresponding to a control signal can be generated by block code.

The steps of a method described in connection with the embodiments disclosed herein may be implemented by hardware, software or a combination thereof. The hardware may be implemented by an application specific integrated circuit (ASIC) that is designed to perform the above function, a digital signal processing (DSP), a programmable logic device (PLD), a field programmable gate array (FPGA), a processor, a controller, a microprocessor, the other electronic unit, or a combination thereof. A module for performing the above function may implement the software. The software may be stored in a memory unit and executed by a processor. The memory unit or the processor may employ a variety of means that is well known to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The invention claimed is:

1. A method of generating a codeword for a control signal in a wireless communication system, the method comprising:
   preparing a control signal; and
   generating a codeword by applying a Reed-Muller (RM) extension matrix to the control signal, wherein the RM extension matrix is generated by extending a RM basic matrix,
   wherein the RM extension matrix is determined by a number of tiles and a modulation scheme; and
   wherein the number of tiles is determined by a number of bits of the control signal.

2. The method of claim 1, wherein the control signal is an uplink control signal.

3. The method of claim 1, wherein the RM extension matrix is generated by adding a dummy matrix to the RM basic matrix.

4. The method of claim 3, wherein the dummy matrix has elements each equal to one positioned in the last row, and elements each equal to zero positioned in the other rows.

5. The method of claim 1, wherein the RM extension matrix is generated by adding a bi-orthogonal matrix of the RM basic matrix to the RM basic matrix.

6. The method of claim 1, wherein the RM extension matrix is generated by adding a bi-orthogonal matrix of the RM basic matrix and a dummy matrix to the RM basic matrix.

7. The method of claim 1, wherein the RM extension matrix is generated by repeatedly adding the RM basic matrix.

8. A method of transmitting a control signal using a plurality of subcarriers in a wireless communication system, the method comprising:

generating a codeword from the control signal using RM code;

mapping the codeword to a plurality of data symbols;

mapping the plurality of data symbols to a plurality of subcarriers; and transmitting the plurality of subcarriers, wherein the RM code employs a RM extension matrix which is generated by extending a RM basic matrix;

wherein the RM extension matrix is determined by a number of tiles and a modulation scheme; and wherein the number of tiles is determined by a number of bits of the control signal.

9. A method of claim 8, wherein the plurality of subcarriers is split into at least one tile, the tile comprising consecutive subcarriers over a plurality of OFDM symbols.

10. A method of claim 9, wherein the tile has four consecutive subcarriers over three OFDM symbols.

11. A method of claim 9, wherein the tile has three consecutive subcarriers over three OFDM symbols.

* * * * *